United States Patent
Titus

(10) Patent No.: US 11,642,633 B2
(45) Date of Patent: May 9, 2023

(54) FLOATING, SUB-SURFACE DISCHARGE AERATOR

(71) Applicant: Titus Wastewater Solutions Inc., Casper, WY (US)

(72) Inventor: Lewis Titus, Prineville, OR (US)

(73) Assignee: Titus Wastewater Solutions Inc., Casper, WY (US)

( * ) Notice: Subject to any disclaimer, the term of this patent is extended or adjusted under 35 U.S.C. 154(b) by 43 days.

(21) Appl. No.: 17/159,721

(22) Filed: Jan. 27, 2021

(65) Prior Publication Data

US 2021/0299616 A1    Sep. 30, 2021

Related U.S. Application Data

(60) Provisional application No. 63/020,105, filed on May 5, 2020, provisional application No. 62/994,326, filed on Mar. 25, 2020.

(51) Int. Cl.
*B01F 23/231* (2022.01)
*C02F 1/78* (2006.01)
(Continued)

(52) U.S. Cl.
CPC ........ *B01F 23/2312* (2022.01); *B01F 33/503* (2022.01); *C02F 1/78* (2013.01);
(Continued)

(58) Field of Classification Search
CPC ................ B01F 23/2312; B01F 33/503; B01F 23/231264; B01F 2101/305;
(Continued)

(56) References Cited

U.S. PATENT DOCUMENTS 3,193,260 A * 7/1965 Lamb ................. E02B 1/003
261/24
4,070,423 A * 1/1978 Pierce ............... B01F 35/3203
261/122.1

(Continued)

FOREIGN PATENT DOCUMENTS

JP    H10-229781 A    9/1998
JP    H-10229781 A *  9/1998  ............ B01F 3/04
JP    2007000777 A *  1/2007  ........... Y02W 10/10

OTHER PUBLICATIONS

Translation of Azuma (JP_2007000777_A) (Year: 2007).*

*Primary Examiner* — Nam X Nguyen
*Assistant Examiner* — Ekandra S. Miller-Cruz
(74) *Attorney, Agent, or Firm* — Shelly M. Fujikawa; Leber IP Law

(57) ABSTRACT

A floating aerator that is highly efficient in oxygenating water and wastewater utilizes high-volume, low pressure air that is diffused into a sub-surface oxygen transfer chamber in which water and wastewater is oxygenated. An air lift is created in the oxygen transfer chamber through the discharge of air bubbles in the water column in the aerator. The aerator comprises a floating head having a concave lower surface, a main chamber or barrel that defines the oxygen transfer chamber, and an air diffuser that extends coaxially through the float head and barrel interconnects the float head to the barrel such that there is a discharge slot defined between the lower surface of the float head and the barrel. A ballast ring floats the aerator at the desire level such that a flow of air bubbles and oxygenated water or wastewater are discharged at a subsurface level.

13 Claims, 17 Drawing Sheets

(51) Int. Cl.
    *C02F 7/00*         (2006.01)
    *B01F 101/00*     (2022.01)
    *B01F 33/503*     (2022.01)

(52) U.S. Cl.
    CPC ........ *C02F 7/00* (2013.01); *B01F 23/231264* (2022.01); *B01F 2101/305* (2022.01); *C02F 2203/006* (2013.01)

(58) Field of Classification Search
    CPC ........ B01F 23/231232; B01F 23/23124; B01F 23/231263; B01F 23/232311; C02F 1/78; C02F 7/00; C02F 2203/006; C02F 3/22; C02F 3/20; Y02W 10/10
    USPC .......................................................... 210/150
    See application file for complete search history.

(56) References Cited

U.S. PATENT DOCUMENTS

| | | |
|---|---|---|
| 7,874,548 B1 | 1/2011 | McGuffin |
| 7,963,508 B1* | 6/2011 | McGuffin ................ B01F 33/83 210/221.2 |
| 9,533,900 B2 | 1/2017 | Stark |
| 9,539,550 B1* | 1/2017 | Frankel .................. C02F 3/201 |
| 2010/0288683 A1* | 11/2010 | Coomer ................ C02F 3/1247 210/151 |
| 2014/0374928 A1* | 12/2014 | Frankel ............ B01F 23/23124 261/122.1 |

\* cited by examiner

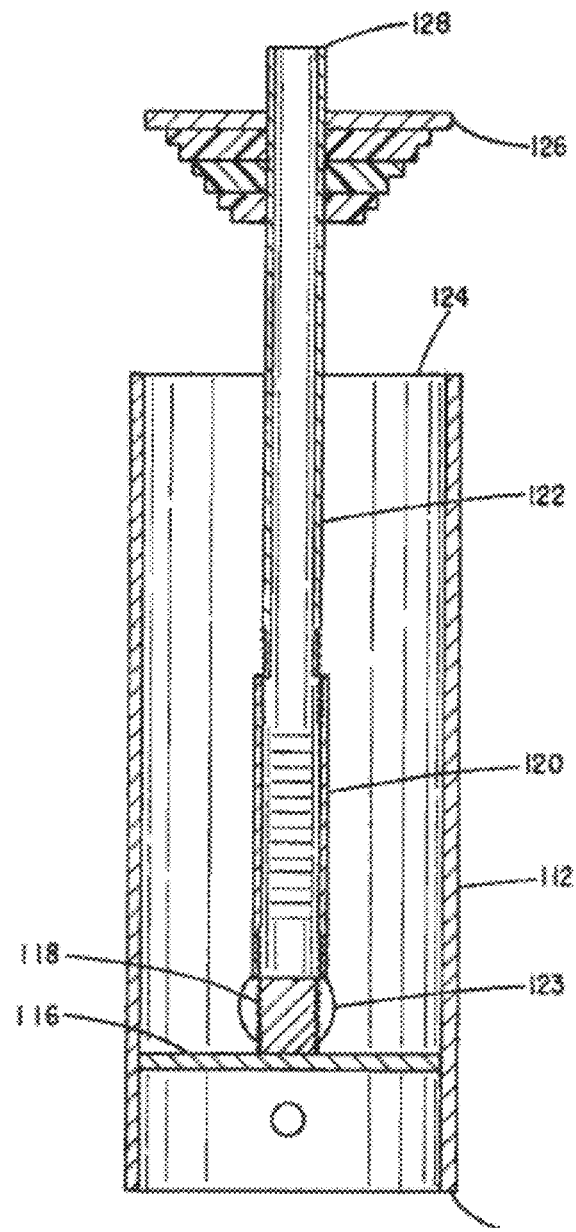
Fig. 1: *Prior Art*

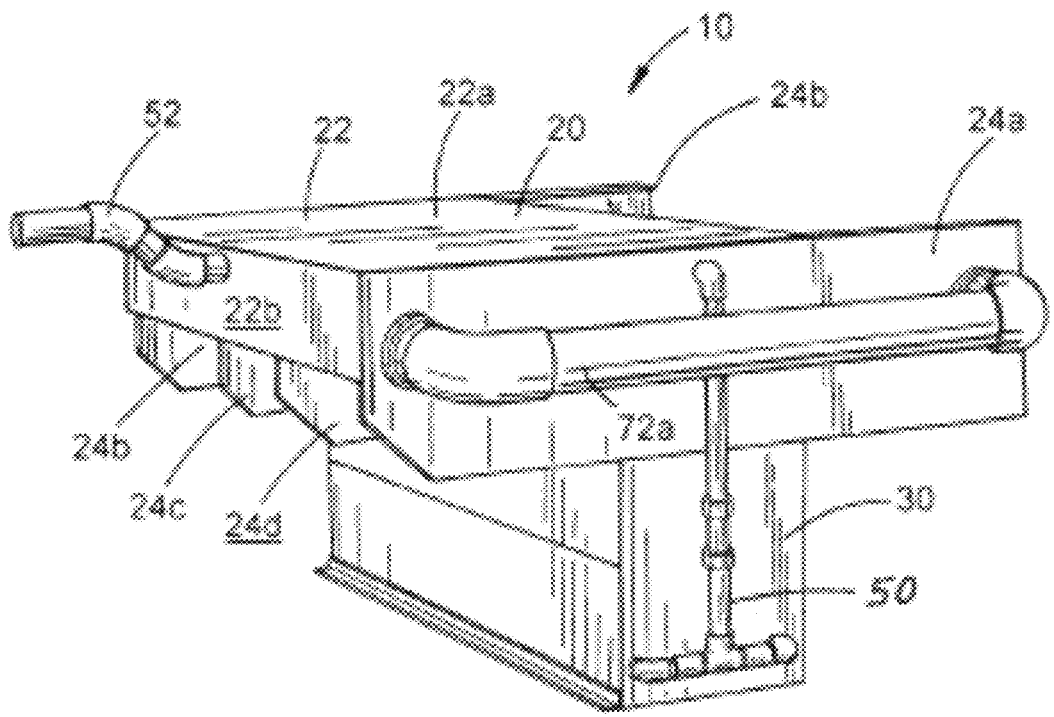
Fig. 2: *Prior Art*
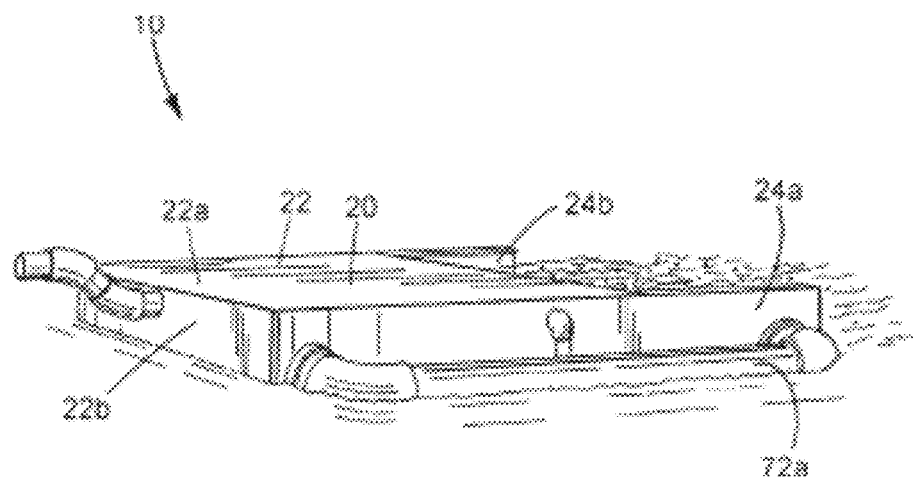
Fig. 3: *Prior Art*

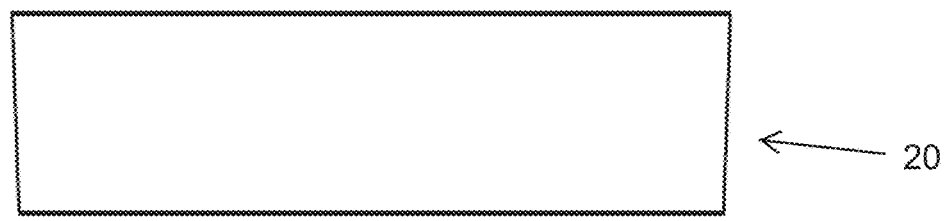
Fig. 13
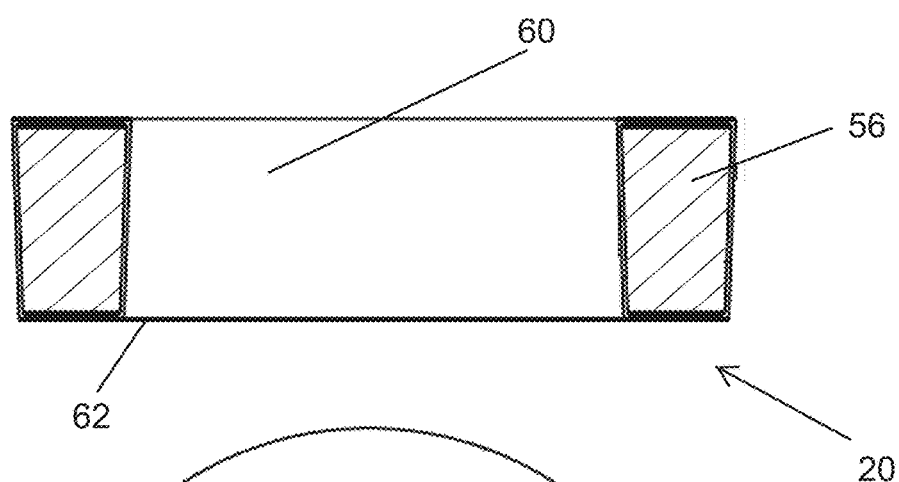
Fig. 14
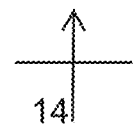
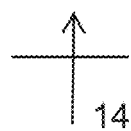
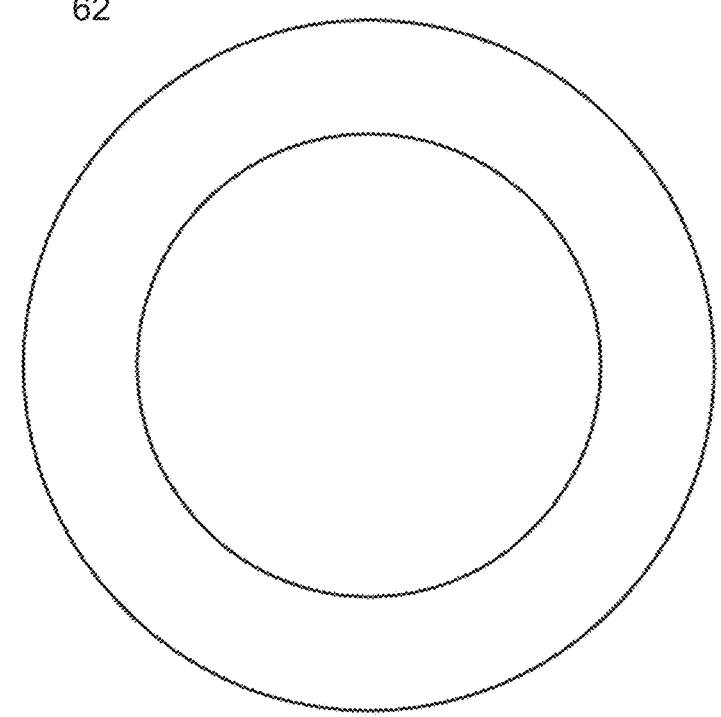
Fig. 15

FLOATING, SUB-SURFACE DISCHARGE AERATOR

TECHNICAL FIELD

The present invention relates generally to apparatus for treating water and wastewater, and more specifically, for aerating ponds and lagoons in water and wastewater treatment facilities, aqua-culture lagoons, pump stations, de-stratifying tanks, and can be used for delivery of ozone and other chemical compounds into the water column. The invention pertains more particularly to a floating, sub-surface discharge device for increasing the dissolved oxygen content of water or wastewater and mixing and de-stratifying the water or wastewater. The invention may also serve to deliver and mix ozone, or other chemical treatments into a water column.

BACKGROUND

In the treatment of wastewater, aerating the wastewater is critically important. In addition, breaking solid particles into small sizes is important and enhances the treatment process. A variety of equipment is used in different stages of the treatment process in order to accomplish these two tasks, namely, reducing particle size and oxygenating the wastewater.

With reference to the FIG. 1, a prior art aerator as described in U.S. Pat. No. 9,533,900 is illustrated. The '900 patent is assigned to Titus Industrial Group, Inc., the assignee of the present invention and the entirety of the '900 patent is incorporated herein by this reference. The aerator described in the '900 application is designed primarily for use in pump lift stations, wet wells and grease interceptors where particle content and the size of particles is high. The aerator is a weighted device that is designed to be lowered to the bottom of the tank in which it is installed, and where it is completely submerged in the wastewater. The device is highly effective in creating a vortex that transports particles into contact with impingement members that break the solids into smaller particles. The device also oxygenates the wastewater.

In later wastewater treatment steps, downstream from pump lift stations, wet wells and the like, the considerations of equipment differ since there exists relatively less need to reduce particle size; however, mixing and oxygenation of the wastewater is very important. With reference to FIGS. 2 and 3, a floating aerating device for use in ponds and lagoons as described in U.S. Pat. No. 7,874,548 is illustrated. While the device serves to pulverize organic solids into micron sizes, allowing bacteria to process the material more readily, it also oxygenates the wastewater. The apparatus comprises an elongate tubular housing that has a solid, preferably heavy, base to maintain the housing in a vertical position within a pond or vessel in which the wastewater to be treated is contained. The housing has three inlet ports spaced 120 degrees apart near the base and an open top. Positioned over the open top is a circular manifold. An air feed conduit is centrally disposed within the housing and extends from the base upward through the manifold where it is adapted to be connected to a source of pressurized air. The air feed conduit includes a plurality of apertures through a wall thereof at a location offset from the bottom end thereof, just above the inlet ports. To stabilize the air feed conduit, three walls or partitions extend between the air feed conduit and the interior wall of the tubular housing, effectively dividing the housing into three chambers, each encompassing one of the inlet ports.

When air, under pressure, is applied to the upper end of the air feed conduit, bubbles are created in the wastewater in which the device is submerged, and the rising bubbles draw wastewater into the housing through the inlet ports. The air bubbles flow vertically from their discharge point and then transition to a horizontal flow around a concave, radiused wall surface such that the bubbles discharge at the surface level of the pond. The air bubbles increase the oxygen content of the wastewater and as the flow exits the open top of the housing, it impinges on the stepped concentric edges on the manifold to break up organic solids present in the wastewater.

The floating device disclosed in the '548 patent is useful for its intended purposes but has some shortcomings. Among other things, surface discharge of the bubbles causes the device to be propelled around the pond by the discharge of air, although an available double-flow device that has opposed discharge ports does not move around the pond. As such, it is often necessary to secure the position with cables or chains. The device also tends to use a large amount of energy to pump sufficient air into the system. With energy costs rising, there is a need to reduce overall costs.

There is a need therefore for improved aerators for use in wastewater treatment, and more particularly, for efficient floating, subsurface discharge aerators. The present invention defines such an apparatus that overcomes the shortcomings of the prior art and provides an efficient, low energy usage aerator.

SUMMARY OF THE INVENTION

The present invention defines a floating aerator that is highly efficient in oxygenating water and wastewater. The invention utilizes high-volume, low pressure air that is diffused into a sub-surface oxygen transfer chamber in which wastewater is oxygenated. An air lift is created in the oxygen transfer chamber through the discharge of air bubbles in the wastewater in the aerator. The aerator comprises a float head, a main chamber or barrel that defines the oxygen transfer chamber, and an air diffuser that extends coaxially through the float head and barrel interconnects the float head to the barrel such that there is a discharge slot defined between the float head and the barrel. A ballast ring floats the aerator at the desire level such that a flow of air bubbles and oxygenated wastewater are discharged at a subsurface level.

BRIEF DESCRIPTION OF THE DRAWINGS

The invention will be better understood and its numerous objects and advantages will be apparent by reference to the following detailed description of the invention when taken in conjunction with the following drawings.

FIG. 1 is a reproduction of a prior art sunken aerator, namely, FIG. 7 from U.S. Pat. No. 9,533,900.

FIG. 2 is a reproduction of a prior art floating aerator, namely, FIG. 1 from U.S. Pat. No. 7,874,548.

FIG. 3 is a reproduction of a prior art floating aerator, namely, FIG. 2 from U.S. Pat. No. 7,874,548.

in FIG. 8 the fill material in the float head and ballast ring is removed to better illustrate these structures.

in FIG. 12 the fill material in the float head and ballast ring is removed to better illustrate these structures.

FIG. 13 is a side elevation view of a weight ring according to the present invention.

FIG. 14 is a side elevation and cross-sectional view of the weight ring shown in FIG. 13, taken along the line 14-14 of FIG. 15.

FIG. 15 is a top plan view of the weight ring shown in FIG. 13.

FIG. 17 is a graph of dissolved oxygen versus time for test run 1A;

FIG. 18 is a graph of dissolved oxygen versus time for test run 2A;

FIG. 19 is a graph of dissolved oxygen versus time for test run 3A;

FIG. 20 is a graph of dissolved oxygen versus time for test run 4A;

FIG. 21 is a graph of dissolved oxygen versus time for test run 5A;

FIG. 22 is a graph of dissolved oxygen versus time for test run 6A.

DETAILED DESCRIPTION OF ILLUSTRATED EMBODIMENTS

Figure 4:
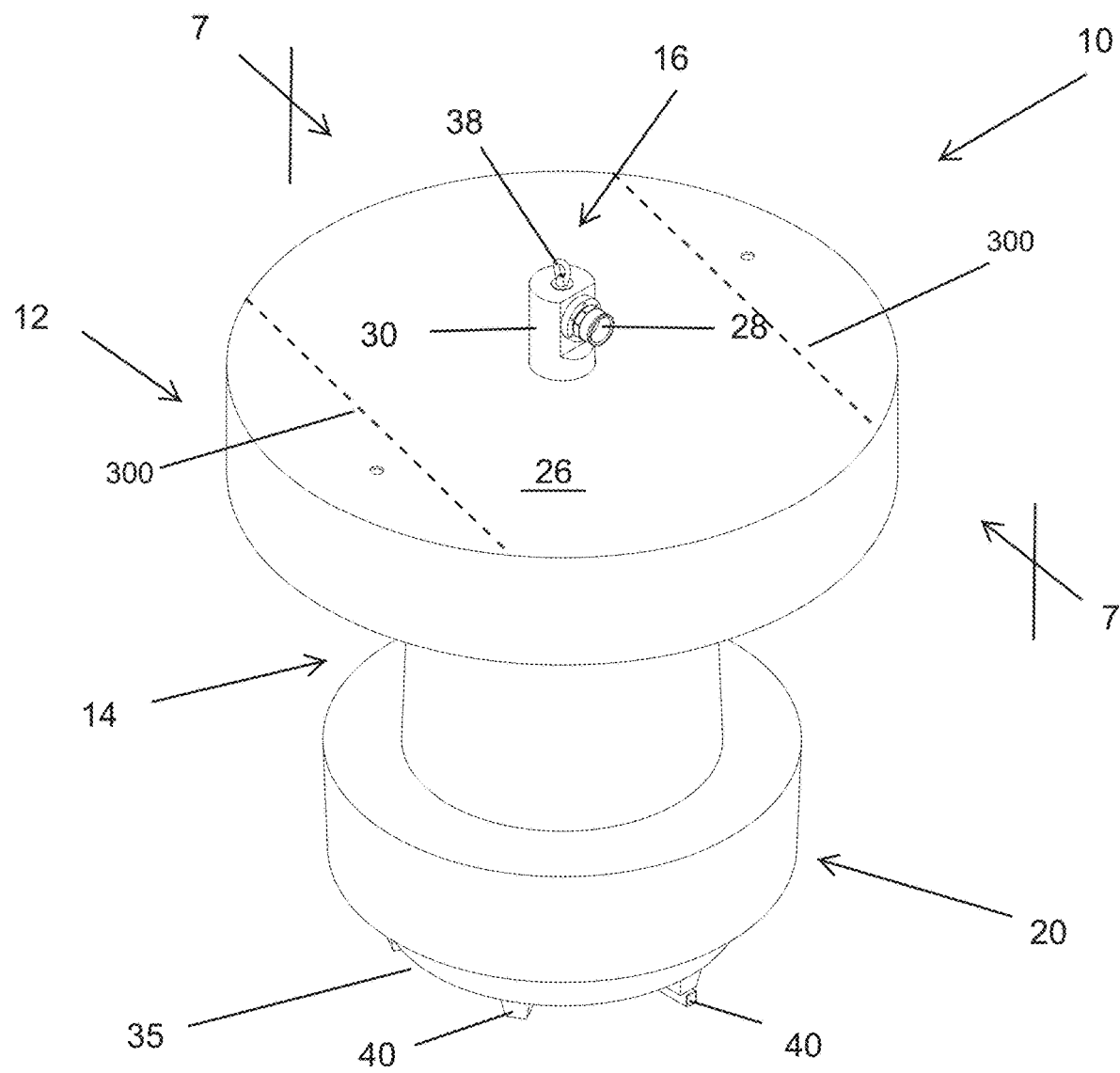
FIG. 4 is an upper perspective view of a first illustrated embodiment of a floating aerator according to the present invention.

The invention will now be described in detail with reference to the drawings. Directional terms used herein correspond to the convention wherein relative terms such as "lower", "upper", "horizontal", "vertical", "above", "below", "up", "down", "top", and "bottom" as well as derivatives thereof (e.g., "horizontally", "downwardly", "upwardly", etc.) should be construed to refer to the orientation as then described or as shown in the drawings under discussion, with the general understanding that the plane defined by the surface of a wastewater pond is a horizontal surface. These relative terms are for convenience of description and do not require that the apparatus be constructed or operated in a particular orientation. Terms such as "connected", "connecting", "attached", "attaching", "join", and "joining" are used interchangeable and referred to one structure or surface being secured to another structure or surface or integrally fabricated in one piece, unless expressly described otherwise. Furthermore, while several embodiments of the invention are described below, like names are used to identify the same or analogous structures used in the several embodiments.

Structure

The floating aerator 10 according to the present invention is illustrated in various embodiments in FIGS. 4 through 23. Generally speaking, aerator 10 comprises a float head 12, a main chamber or barrel 14, the interior of which defines an oxygen transfer chamber 15, and an air diffuser assembly 16 that extends coaxially through the float head and barrel, is attached to the barrel, and interconnects the float head 12 to the barrel 14 such that there is a discharge slot 18 defined between the float head and the barrel, and a weight or ballast ring 20. Each of these and various other structures is described in detail below beginning with float head 12. Although the invention is described herein primarily with respect to its use in a wastewater pond, the invention is equally usable for aerating ponds and lagoons in water and wastewater treatment facilities, aqua-culture lagoons, pump stations, de-stratifying tanks, and can be used for delivery of ozone and other chemical compounds into the water column.

Float head 12 is in the illustrated embodiments, and preferably, a cylindrical, buoyant structure that floats aerator 10 in a pond or lagoon and is preferably fabricated from rotationally molded, medium-density polyethylene (MDPE) but other suitable materials may be used. Materials that are resistant to degradation by UV light are preferred. The float head 12 is injected with high density closed cell foam 13, or some other type of floatation material, to provide buoyancy. The float head 12 has a bore 22 formed axially through the center of the float head for receiving the air diffuser assembly 16, as detailed below.

Figure 7:
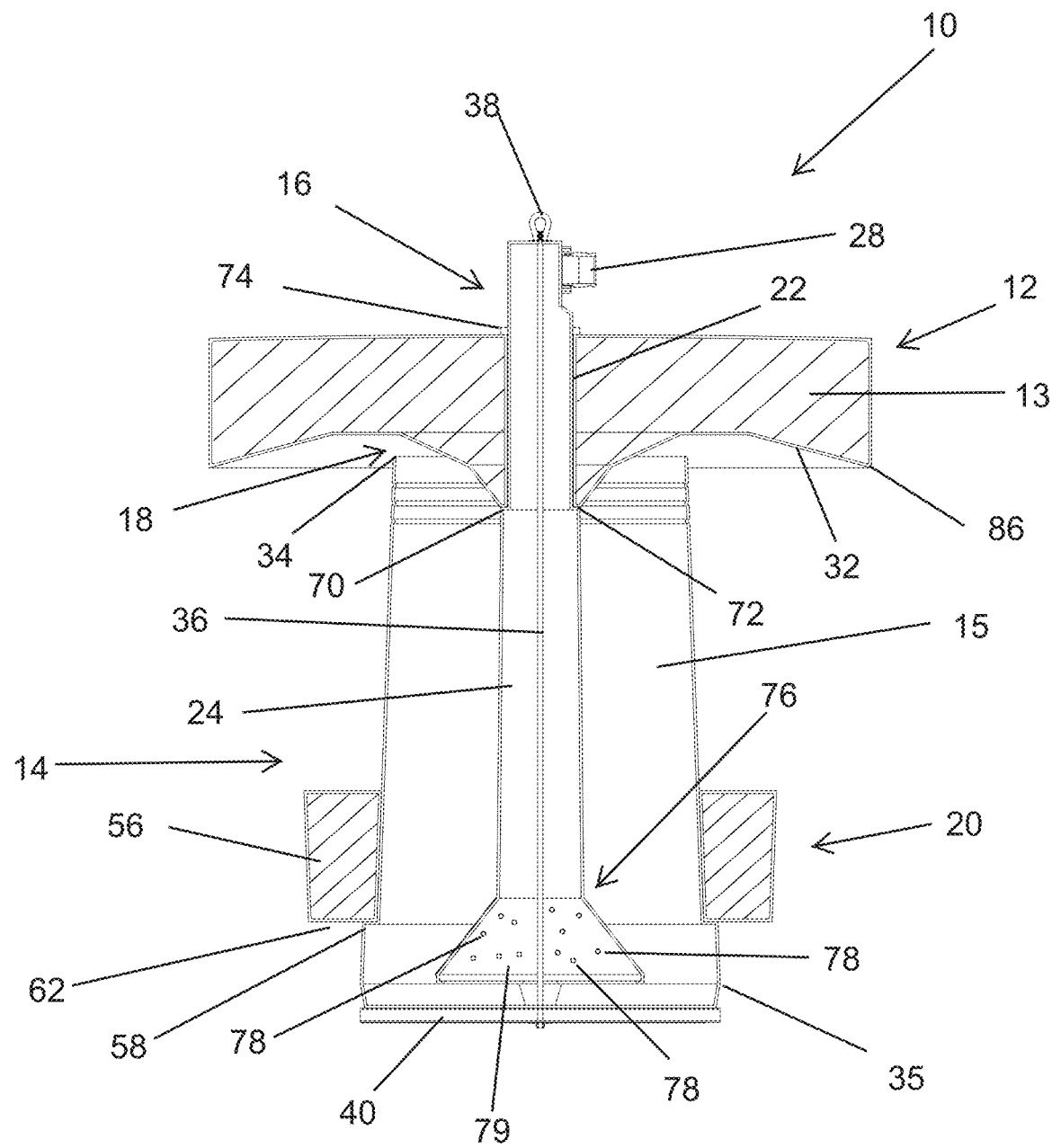
FIG. 7 is a side elevation and cross-sectional view of the floating aerator of FIG. 4, taken along the line 7-7 of FIG. 4.

Barrel 14 defines a generally cylindrical housing with an open upper end, a lower or base end 13 that is in a preferred embodiment open, and an open interior. The barrel 14 also is preferably fabricated from MDPE. In a preferred embodiment, the diameter of the barrel at its lower edge 35 is greater than the diameter of the barrel at its upper edge 34 so that, as visible in the drawings, the side of the barrel slopes inwardly from the lower edge 35 moving toward the upper edge 34. With reference to FIG. 7, a circumferential support ledge 58 is formed on barrel 14 adjacent to and above the lower edge 35 to define a support upon which the ballast ring 20 is supported.

The air diffuser assembly 16 includes an air manifold 24 through which air is injected into the aerator 10. The upper portion 30 of air manifold 24 that extends above the upper surface 26 of float head 12 includes an air intake port 28. The air intake port 28 is a conventional attachment point for the supply of air that is injected into aerator 10—that is, an air feed tube 200 that is preferably flexible (shown schematically in FIG. 16) through which external air is pumped at high volume but low pressure (e.g., 3 to 4 psi) into the air diffuser assembly 16, as described in detail below. The air manifold 24 extends coaxially and downwardly through aerator 10 and serves as the structural component that interconnects the barrel 14 to the float head 12. More specifically, the air manifold 24 extends through the bore 22 through the center of float head 12 and is fixedly connected to the float head. Although the float head may be connected to the air manifold in numerous equivalent ways, a preferred connection is accomplished with a circumferential ledge 70 formed on the air manifold upon which the lower edge 72 of the float head 12 at bore 22 rests. As seen in FIG. 7, for instance, the diameter of the bore 22 is less than the diameter of air manifold 24 at ledge 72 so that the float head rests on the ledge. A retaining ring 74 surrounds the air manifold 24 at the upper surface 26 around bore 22 and secures the interconnection between the air diffuser assembly 16 and the float head 12. The lower end of air manifold 24 flares outwardly at a frustoconical diffuser 76 that is axially arranged relative to the air manifold and which defines the air discharge portion 77 for the air diffuser assembly 16 where air is discharged from the air diffuser assembly 16 and into the wastewater contained in the oxygen transfer chamber 15 of barrel 14. Specifically, frustoconical diffuser 76 has a diffuser layer 79 (such as EPDM) with plural air outlet bores 78, also referred to as apertures, shown schematically in FIG. 7, for example, by drilling. In the semi-schematic illustration of FIG. 7 the number of outlet bores 78 is greatly reduced from what is used in a working system, and the bores are larger in the drawing than they would be in a working system, this to better illustrate these structures.

In a preferred embodiment, the frustoconical diffuser 76 is a rotomolded member with the plural air outlet bores 78 drilled or otherwise formed in the diffuser layer. A membrane 80, preferably of EPDM rubber (ethylene propylene diene monomer) is wrapped around and surrounds the diffuser layer of frustoconical diffuser 76 and is sealed to the diffuser at the upper and lower margins of the diffuser 76 and membrane 80 (the membrane 80 is shown schematically in, for example, FIG. 16). As detailed below, the EPDM membrane 80 defines plural slits 82, shown schematically in FIG. 16, that define apertures that allow air to pass from the outlet bores of diffuser 76 through the slits 82 of membrane 80 and into the oxygen transfer chamber 15. While EPDM is one preferred material for fabricating membrane 80, other materials function equally as well, including but not limited to Hypalon, Viton, and silicone.

Figure 6:
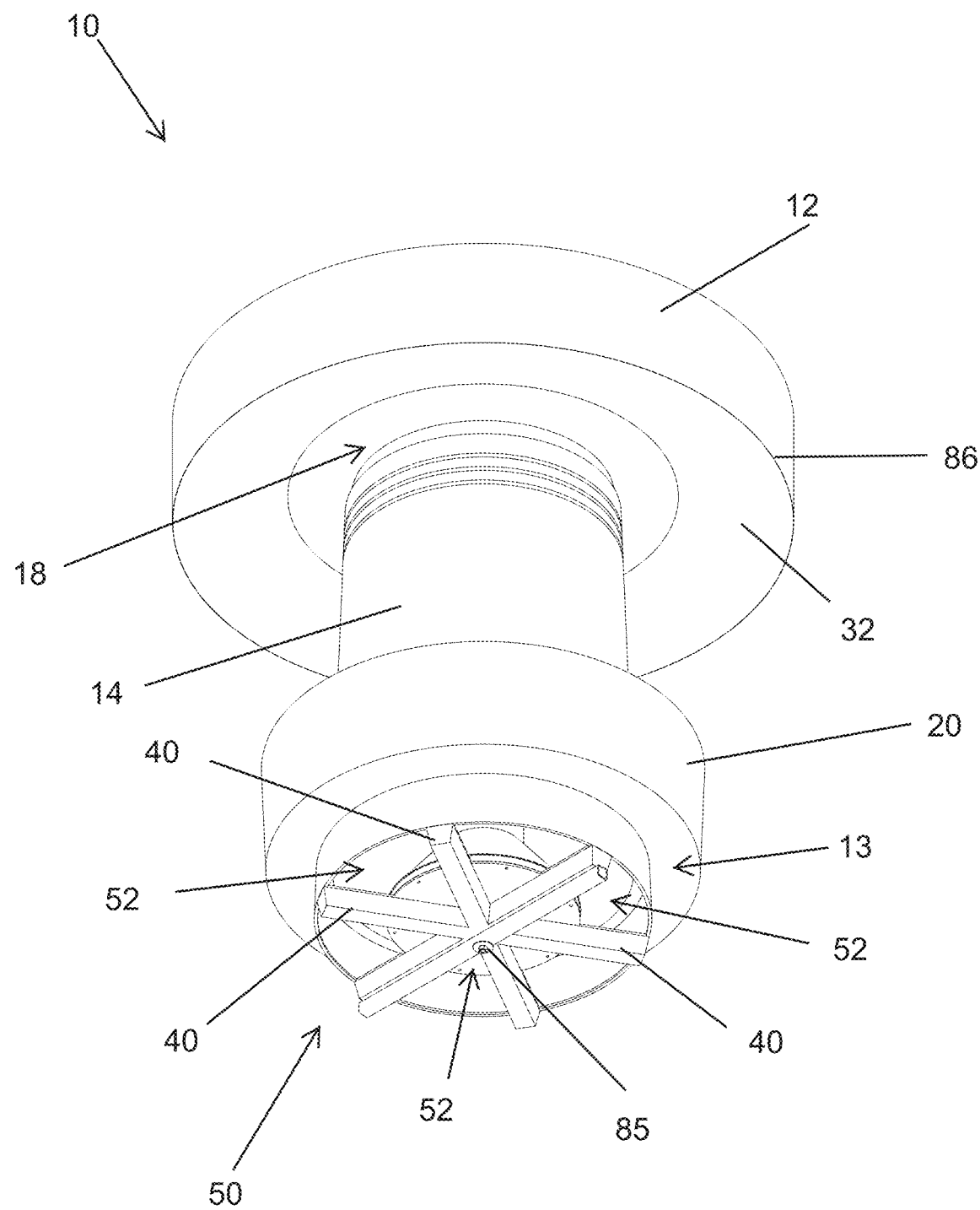
FIG. 6 is a lower perspective view of the floating aerator of FIG. 4.
Figure 8:
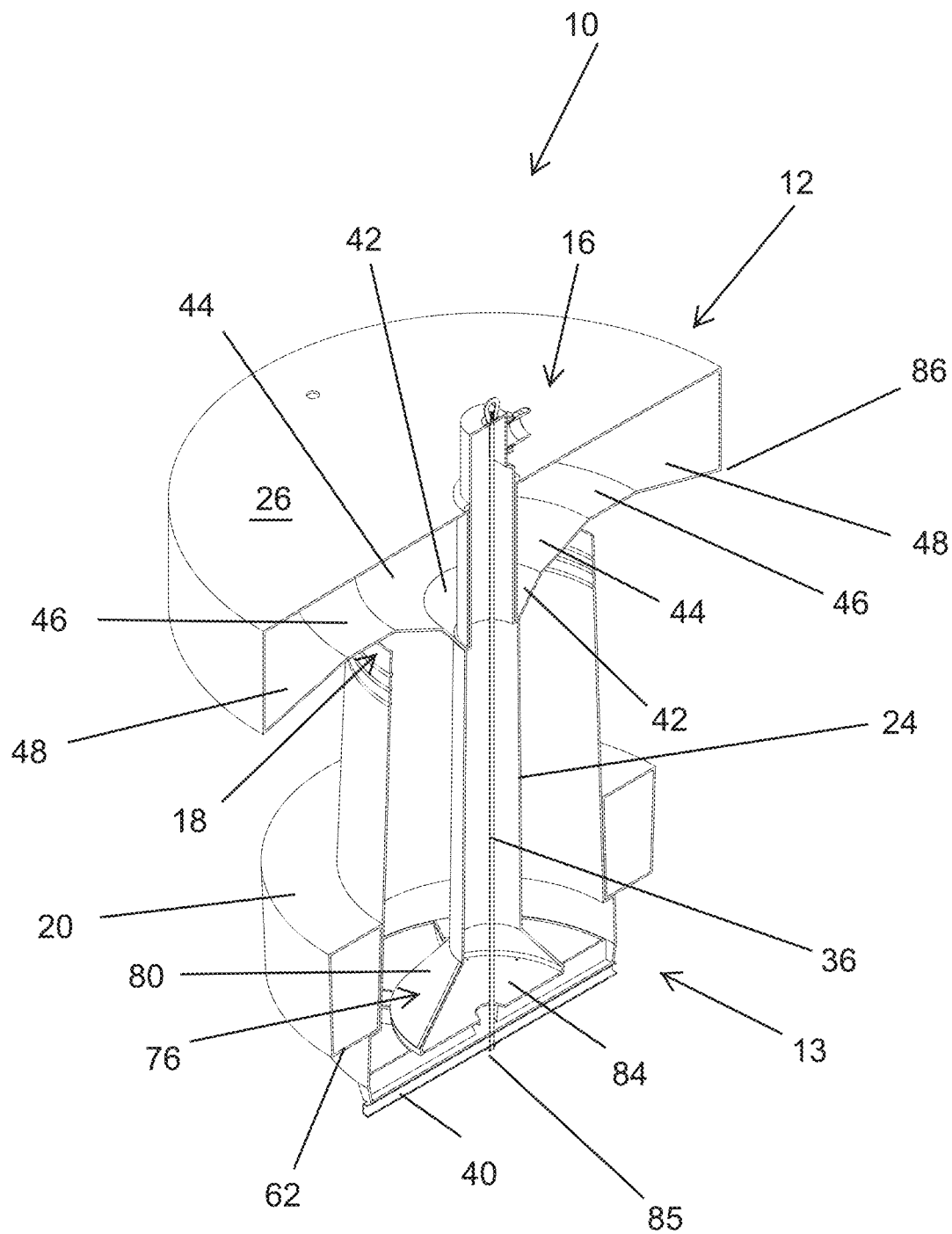
FIG. 8 is an upper perspective and cross-sectional view of the floating aerator of FIG. 4, also taken along the line 7-7 of FIG. 4.
Figure 9:
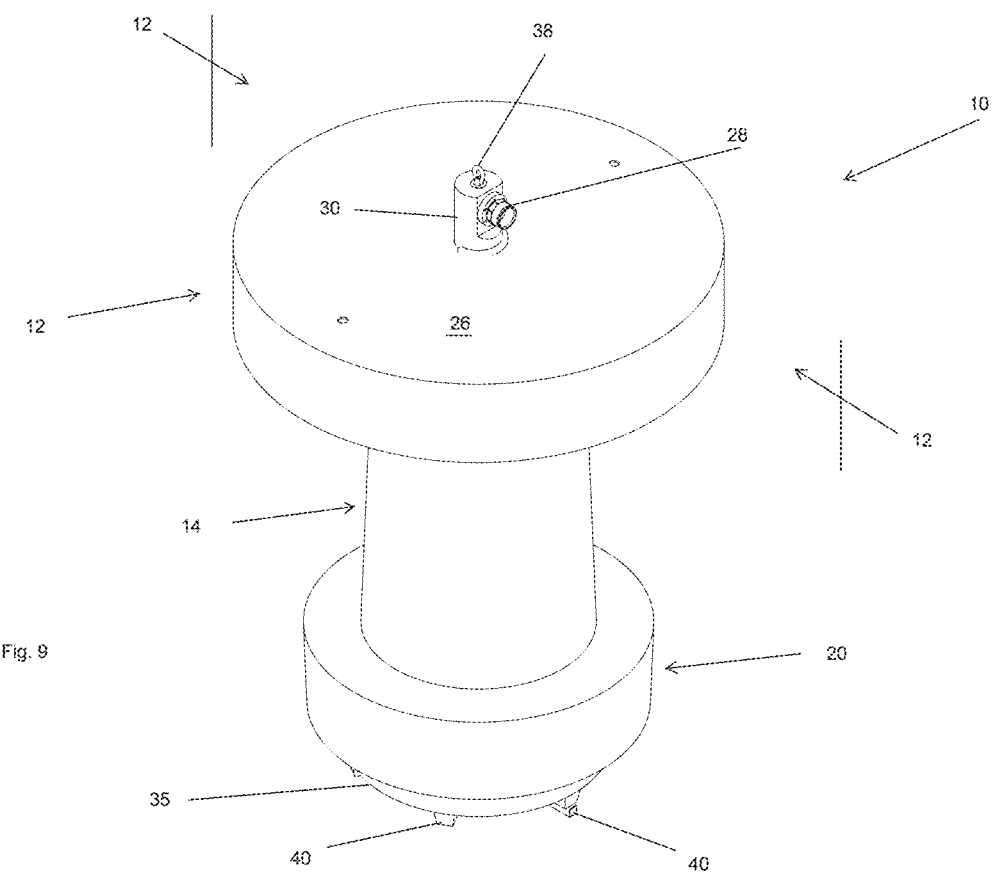
FIG. 9 is an upper perspective view of a second illustrated embodiment of a floating aerator according to the present invention.
Figure 10:
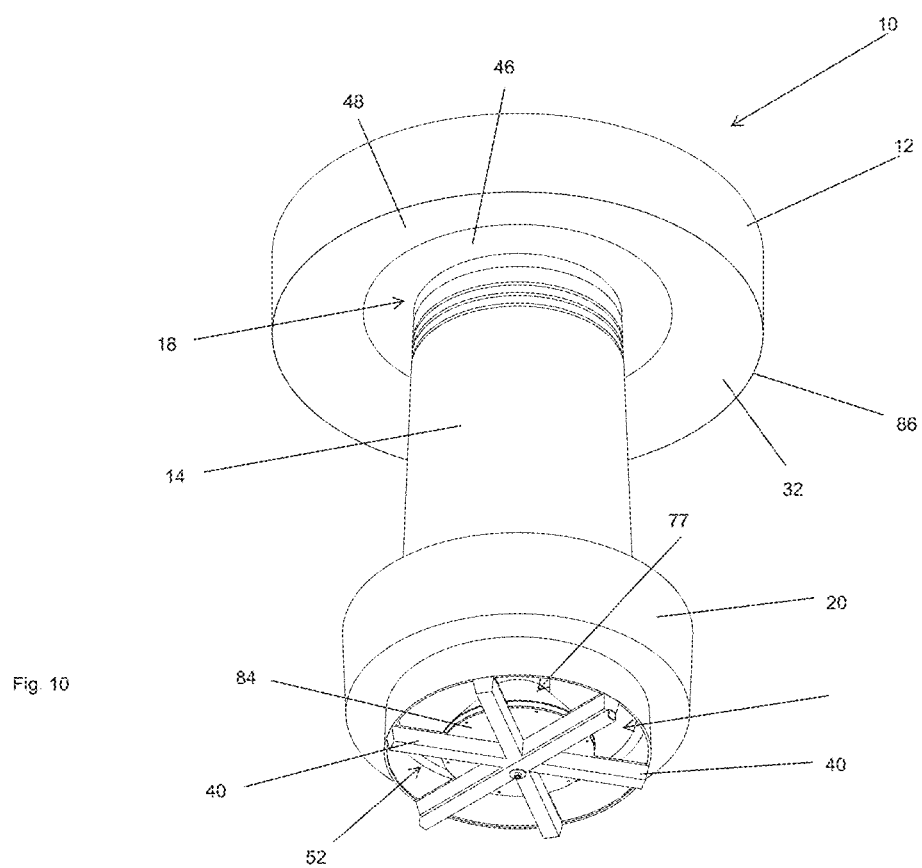
FIG. 10 is a lower perspective view of the floating aerator of FIG. 9.
Figure 11:
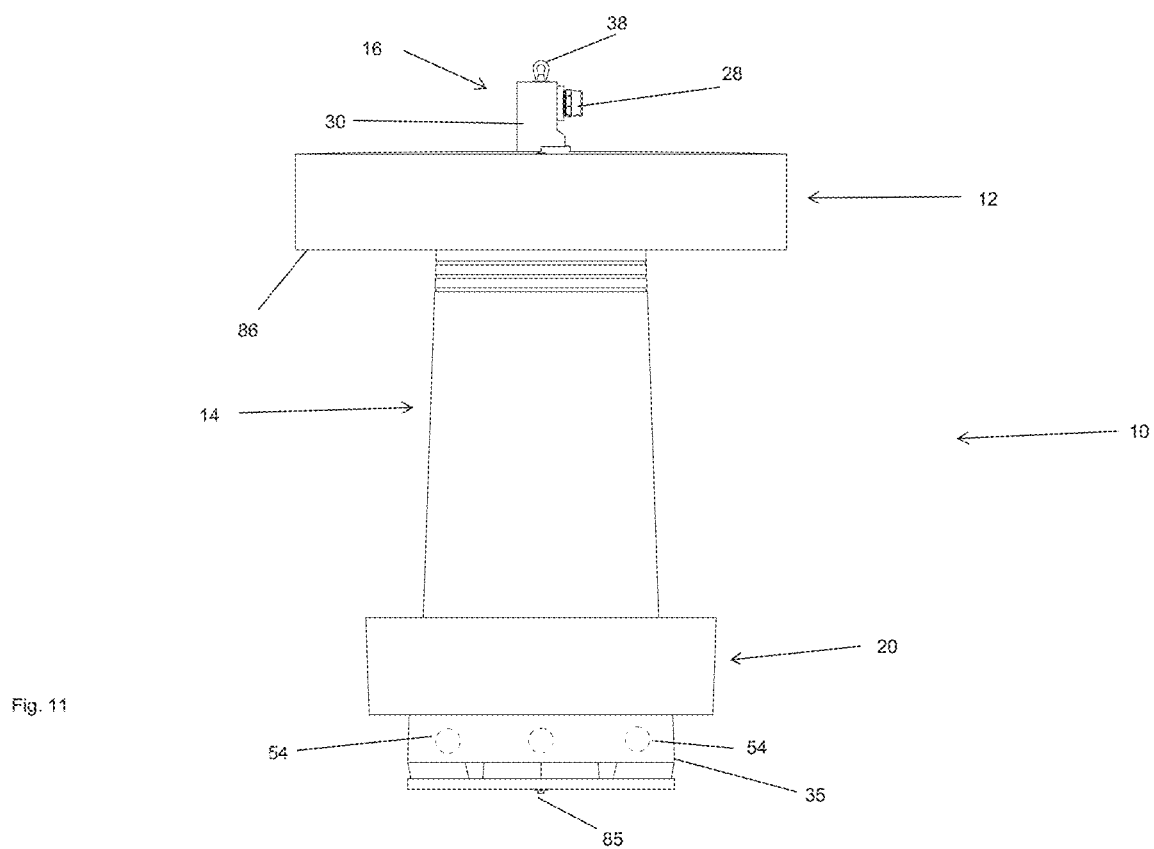
FIG. 11 is a side elevation view of the floating aerator of FIG. 9.
Figure 12:
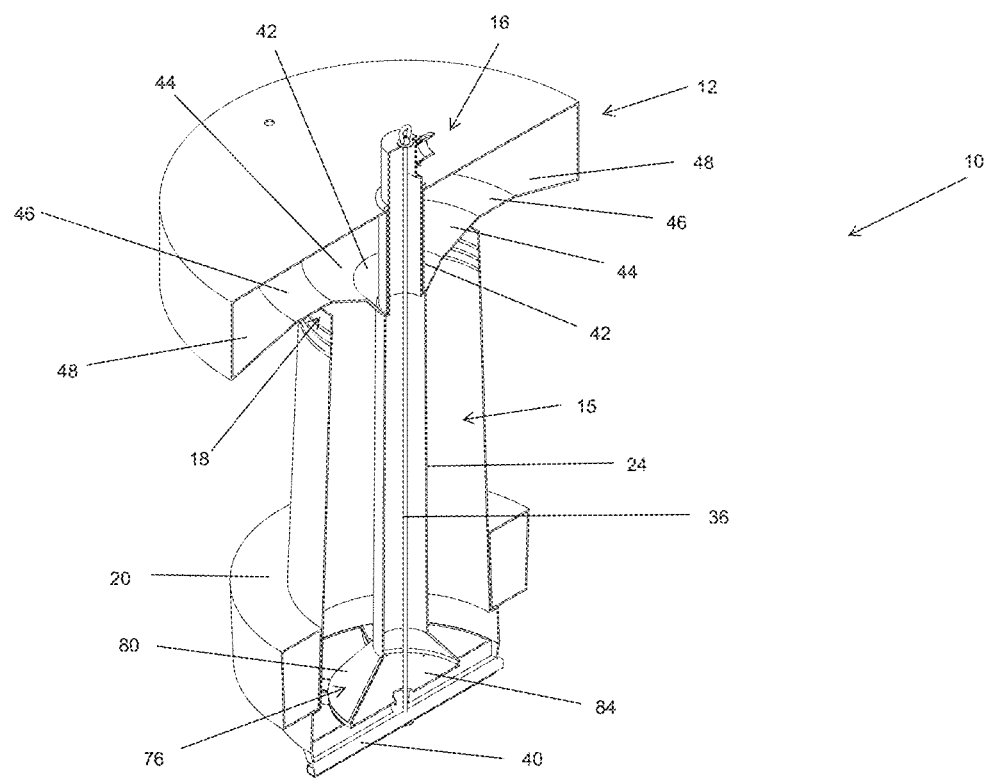
FIG. 12 is an upper perspective and cross-sectional view of the floating aerator of FIG. 9, taken along the line 12-12 of FIG. 4.

With reference to FIGS. 6 and 8, the lower end of air manifold 24 at the lower edge of frustoconical diffuser 76 is closed and sealed with a plate 84. A metal rod 36 extends coaxially through air diffuser assembly 16 and at its upper end defines an expose lifting eye 38 and at its lower end the rod 36 extends through plate 84 and is attached to plural, radially extending support struts 40, for instance, with a nut 85. The metal rod 36, lifting eye 38 and struts 40, which are preferably stainless steel, define a lifting assembly that allows the entire aerator 10 to be hoisted by a crane and positioned in, and removed from a pond.

With continuing referenced to FIG. 7, when the float head 12, barrel 14 and air diffuser assembly 16 are assembled, a 360-degree air/water discharge slot 18 is formed between the lower surface 32 of the float head 12 and the uppermost edge 34 of the barrel 14. The air manifold 24 interconnects the air diffuser assembly 16 to the barrel 14 and the length of air manifold 24 is sized so that the uppermost edge 34 of the barrel 14 extends above the lowermost peripheral edge 86 of float head 12. The air/water discharge slot 18 is the space above the uppermost edge 34 of the barrel 14 and the lower surface 32 of float head 12 that is immediately above the edge 34, and is preferably in the range of 2.5 to 4.5 inches in width, and more preferably about 3 inches. The discharge slot preferably extends 360 degrees around the barrel 14.

Returning to the description of float head 12, and as shown in FIGS. 6, 7 and 8, the lower surface 32 of float head 12 is concave and the concavity is preferably defined by concentric, adjacent, sloping planar sections 42, 44, 46 and 48, wherein section 42 is the innermost section and surrounds the air manifold 24 and as may be seen, is in the shape of an inverted frustoconical structure. The outermost planar section 48 defines a downward angle of about 15 degrees relative to the horizontal plane defined by the wastewater level, which is shown schematically and in phantom lines in FIG. 16 with reference number 212, and terminates at the lower peripheral edge 86 of the float head 12. It will be appreciated that the concavity of lower surface 32 may be smoothly curving rather than formed with concentric, adjacent, sloping planar sections.

Figure 5:
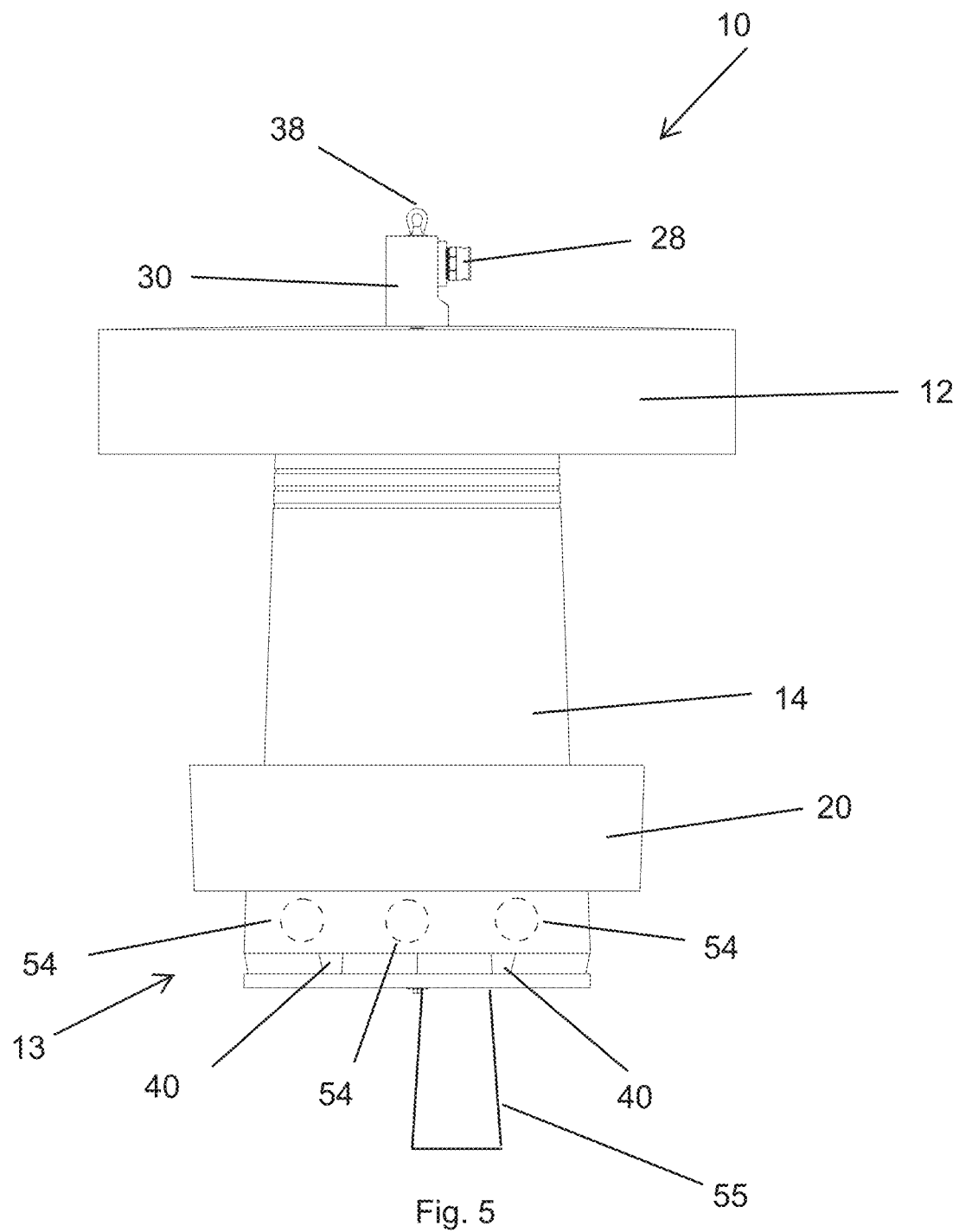
FIG. 5 is a side elevation view of the floating aerator seen in FIG. 4.

The float head 12 is cylindrical and is oversized relative to the diameter of barrel 14. As seen in the drawings, the float head and barrel are coaxially arranged relative to one another and interconnected with the air diffuser assembly 16 and the diameter of the float head 12 is greater than the diameter of the barrel 14. The float head 12 provides buoyancy, as described above, and may be filled with, for example, closed cell foam 13. In the embodiment of FIG. 6, the lower end 50 of barrel 14 is open to define plural wastewater intake ports 52 between the plural support struts 40. This is best illustrated in FIG. 6. Alternately, the lower end 50 of barrel 14 may be closed and plural side intake ports 54, three of which are shown schematically in phantom lines in FIGS. 5 and 11, may be formed at the lower sides of the barrel. This alternate arrangement may be utilized with an apparatus 10 designed for use in relatively shallow ponds. When the inlet ports 52 are defined between the support struts 40 as shown in FIG. 6, the support struts 40 interconnect the lower end of the diffuser assembly 16 to the barrel 14 as described above. If the alternate arrangement of side inlet ports 54 positioned as shown in the phantom lines of FIG. 5 is utilized, the lower end 50 of barrel 14 may be closed and the lower edge if frustoconical diffuser 76 may be attached directly to the closed lower end of the barrel.

Figure 16:
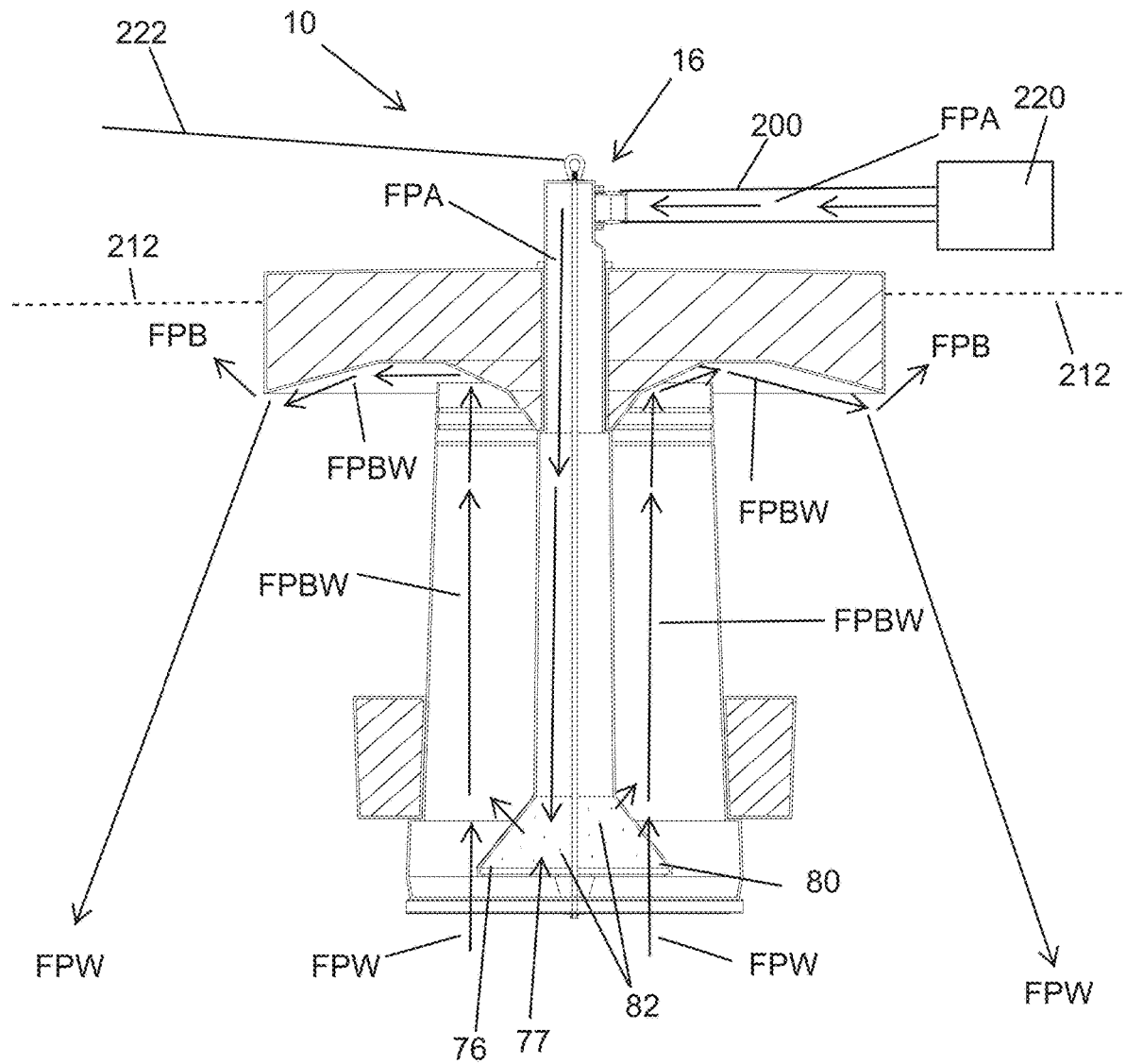
FIG. 16 is side elevation and cross-sectional view of the floating aerator shown in FIG. 9, taken along the line 12-12 of FIG. 9, and illustrating the flow paths of air, wastewater, and air bubbles through the apparatus during operation.

A weight or ballast ring 20 is attached to and surrounds the barrel 14 and contains an appropriate amount of ballast material 56 to cause the aerator 10 to float at the desired level as shown with wastewater level 212 in FIG. 16. More specifically, the amount of ballast material should be sufficient to float the aerator 10 such that the peripheral edge 86 of the float head is submerged below the surface of the wastewater (212) and such that the upper surface of the float head is above the surface. The ballast ring 20 is shown in isolation in FIGS. 13, 14 and 15. The amount of ballast material 56 added to ballast ring 20 to float the aerator 10 at the desired level depends upon the size of the aerator and the amount of buoyancy contributed by the float head 12. In a preferred embodiment, up to 2500 lbs of concrete ballast 56 may be in ballast ring 20. The type of material used for the ballast, and the amount, may vary depending upon factors such as the size of the apparatus, and the installation parameters where it is installed. A preferred manner to attach the ballast ring to barrel 14 is to define a support ledge 58 extending circumferentially around barrel 14 adjacent to and upwardly of the lower edge 35 of the barrel, as best seen in FIG. 7. The interior wall 60 (FIG. 14) of the ballast ring 20 is sloped at the same angle as the side wall of barrel 14. Accordingly, the ballast ring 20 may be slid downwardly over the barrel until the lower edge 62 of the ballast ring rests atop the circumferential ledge 58.

Turning now to the embodiment of an aerator 10 as illustrated in FIGS. 9 through 12, the aerator in those figures is identical to the aerator 10 shown in FIGS. 4 through 8 both in terms of structure and operation, except in respect of the size of the aerator. Specifically, the aerator 10 of FIGS. 4 through 8 is designated as a "6 foot" unit and is nominally around 6 feet in height measured from the approximate center of the frustoconical diffuser 76 to the wastewater level (FIG. 16, reference number 200). The aerator 10 of FIGS. 9 through 12 is an "8 foot" unit, nominally around 8 feet in height measured in the same dimensions. The size of the aerator may be varied according to need and the size used in any particular location depends upon local conditions, including such factors as the depth of the pond that is to be oxygenated, the size of the pond, local weather conditions and patterns, etc. Ideally, the size of the aerator used in any particular installation should be the greatest allowed given the depth of the pond or lagoon in which the aerator is installed, because oxygen transfer rates are increased with increasing depth due to the increase in hydraulic pressure with increasing depth.

Operation of the aerator 10 will now be described in detail. An air supply hose 200 (shown schematically in FIG. 16) is connected to the air intake port 28 of air diffuser assembly 16 in a conventional manner, preferably with a reliable quick-connect fitting such as a stainless steel cam lock connection and, at its source end, is connected to an external air source such as air pump 220 that is configured to supply high-volume, low-pressure air to the aerator, preferably at no more than 4 psi. The aerator 10 with the air supply hose 200 attached is placed in a pond or lagoon at a desired location. The float head 12 is manufactured with sufficient floatation foam to float the aerator 10, and the amount of weighting material in ballast ring is adjusted so that the entire floating aerator assembly 10 is unsinkable, and so that the lower peripheral edge 86 of float head 12 remains beneath the surface of the wastewater (see FIG. 16 and discussion above).

With continuing reference to FIG. 16, the flow paths of air, air bubbles, and wastewater are illustrated. A flow of air is initiated from the air supply through air supply line 200 and the air flows through air intake port 28 and downwardly through air manifold 24. The flow pathway of air into aerator 10 is labelled FPA. The air flows into the frustoconical air discharge portion 77 and through the plural bores 78 and as the air flows through the plural bores 78 the air pressure causes the EPDM membrane 80 to expand and balloon outwardly, away from the conical section 76 and diffuser layer 19. This expansion of the EPDM membrane causes the plural slits 82 in the membrane to expand and open, which allows air to flow through the plural slits 82 as small bubbles and into the wastewater. Air exiting the apertures defined by slits 82 creates countless smaller diameter bubbles, which mix with the wastewater and flow upwardly in a radial, cyclonic pattern around the air manifold 24. This swirling vortex and upward flow of bubbles and wastewater creates a well-known and documented air lift effect that draws wastewater through the plural intake ports 52 in the lower end of the aerator 10 and upwardly through the oxygen transfer chamber 15 defined by the barrel 14. This causes mixing, circulation, and aeration of the wastewater. The flow path of wastewater is identified with arrows with the reference FPW in FIG. 16. As the wastewater flows upwardly around and past the air discharge portion 77 it is mixed with air bubbles, and the flow path representing the mixing air bubbles and wastewater is designated with arrows FPBW. It should be noted that the number of slits 82 shown in the drawings is greatly reduced from what is used in a working system, and the slits are larger in the drawing than they would be in a working system, this to better illustrate these structures.

The swirling vortex of air bubbles and wastewater rise toward the surface of the wastewater and impinge the lower surface 32 of the float head 12, which as noted is concave and slopes downwardly moving from the axial center of the float head toward the lower peripheral edge 86, which remains beneath the surface of the wastewater. As the bubbles impinge on the lower surface 32, a flow of bubbles and wastewater moves downwardly and outwardly along the lower surface until the bubbles flow beneath the lower peripheral edge 86—represented in FIG. 16 with arrows FPBW. It is difficult to force bubbles downwardly through a column of wastewater due to the buoyancy of the bubbles, and this is especially true with larger bubbles. As such, many of the bubbles flow over the lower peripheral edge 86 and upwardly toward the surface—arrows FPB. Nonetheless, some small bubbles travel downwardly in the wastewater column after flowing past the lower peripheral edge 86. The flow of wastewater—however, is directed downwardly through the wastewater column and downward flow typically extends beyond the bottom or aerator 10 and even to the bottom of the pond. This flow path for bubbles and wastewater is illustrated schematically in the cross-sectional view of FIG. 16 where the flow path is identified with the arrows bearing reference letter FPW. It will be appreciated that this schematic flow path does not illustrate that the bubbles are moving upwardly in a spiraling vortex around the air manifold 24 within the oxygen transfer chamber 15. The oxygen content of the wastewater greatly increases as the air bubbles and wastewater mix in the turbulent mixing zone and conditions created in the oxygen transfer chamber.

Because (a) the air discharge portion 77 that is defined by the frustoconical diffuser 76 flares outwardly, away from the axial center of the air diffuser assembly 16 and air manifold 24 (the axial center defined by rod 36), (b) the entire surface of the frustoconical diffuser 76 includes plural apertures 78, and (c) the enveloping membrane 80 includes plural apertures 82 over the entire membrane, air bubbles that escape from the apertures 82 are horizontally separated in the vertical water column. Thus, bubbles that are released from apertures close to the axial centerline, near to uppermost edge of membrane 82 rise toward the surface closely to the outside of the air manifold. Bubbles that are released from apertures in the membrane that are incrementally spaced further away from the axial centerline tend to rise toward the surface in a different vertical column of water. This results in incremental horizontal separation of bubble streams from the apertures closest to the upper edge of the membrane to the apertures furthest away from the centerline at the lower edge of the membrane, and this helps to decrease the number of small bubbles that combine to form larger bubbles— smaller bubbles have a higher surface to volume ration and are preferred to increase oxygen transfer.

As noted, the lower peripheral edge 86 of float head 12 is always below the surface 212 of the wastewater. The air bubbles that flow through the membrane 80 are small, but as they flow toward the surface, many of the bubbles increase in size due to the decrease in wastewater pressure in the wastewater column. As relatively larger, expanded bubbles impinge on the conical lower surface 32 of the float head, they are directed downwardly and deeper into the wastewater column. This tends to cause the size of the bubbles to again decrease in size as the wastewater pressure increases at greater depth. It has been found that this decrease in bubble size coupled with the swirling, turbulent vortex movement of the wastewater in oxygen transfer chamber 15 causes very small bubbles (with relatively large surface area to volume ratios) to be pushed deeper into the wastewater than the peripheral lower edge 86 of the float head 12. This sub-surface recompression of the bubbles greatly increases oxygenation of the wastewater.

As described above, as the air bubbles flow vertically upwardly in the oxygen transfer chamber 15 from the EPDM membrane 80, they flow in a radial cyclonic motion and are directed against the lower surface 32 of the float head 12. The flow of bubbles and wastewater is directed outwardly from the axial center of the aerator 10 and around the 360-degree peripheral edge 86. Accordingly, there is no "jetting" effect caused by the bubbles or wastewater flow that would tend to propel the floating aerator 10 around the pond and the apparatus tends to remain in a small area in the pond, which often makes anchoring or position-stabilizing with cables unnecessary. Moreover, and importantly, because air is initially discharged into the diffuser tube at or above the surface of the wastewater rather than at a sub-surface initial injection point, the pump 220 used to supply air to the apparatus may be rated at a greatly reduced capacity relative to the pump used in a system that discharges air at a sub-surface injection point. Accordingly, a low horsepower pump is all that is required for use with the present invention, relative to a pump that is designed to dispense air at a sub-surface depth. In contrast, with aerators that inject air into the system below the surface of the wastewater, for instance, as with the aerator described in U.S. Pat. No. 7,874,548, a pump with a far greater rating (i.e., higher pressure) and far greater horsepower is required. As the costs of energy continue to increase, a reduction in the horsepower of pumps used in aeration systems represents substantial economic advantages.

On initial startup of aerator 10 in a pond, wastewater drawn into the oxygen transfer chamber 15 through intake ports 52 may have a very low oxygen concentration, or may even be deoxygenated. As the wastewater is drawn into the swirling vortex of bubbles within the oxygen transfer chamber 15, the wastewater is efficiently and quickly oxygenated.

Figure 17:
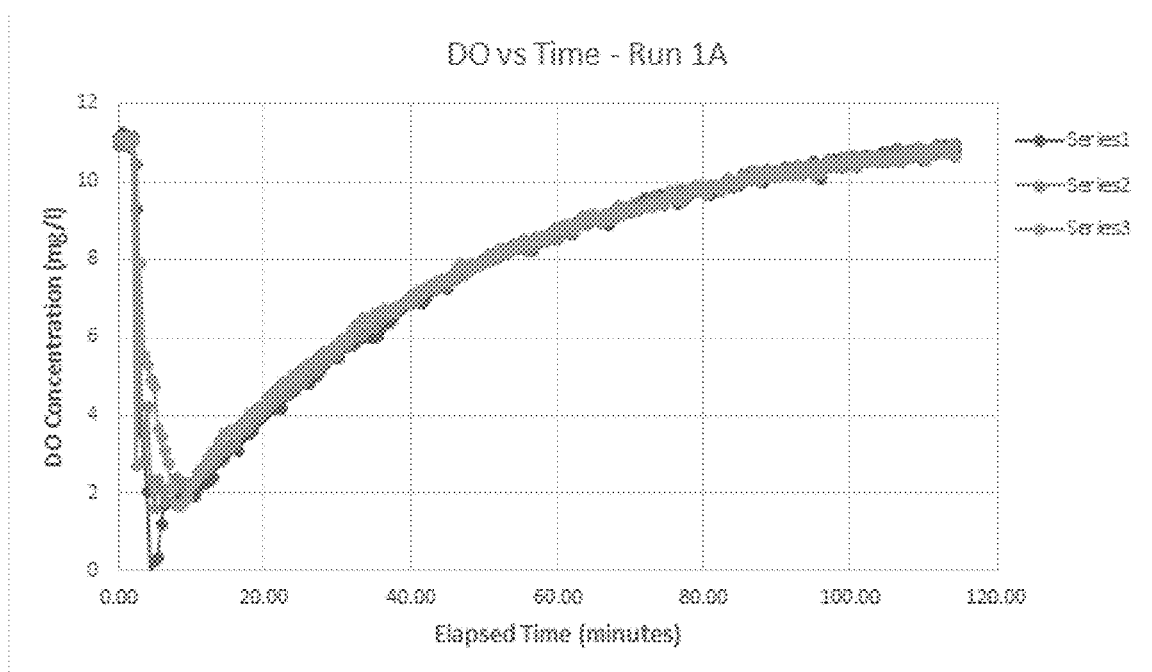
FIGS. 17 through 22 are graphs depicting analytical results from tests of the aerator according to the present invention, and more particularly.
Figure 18:
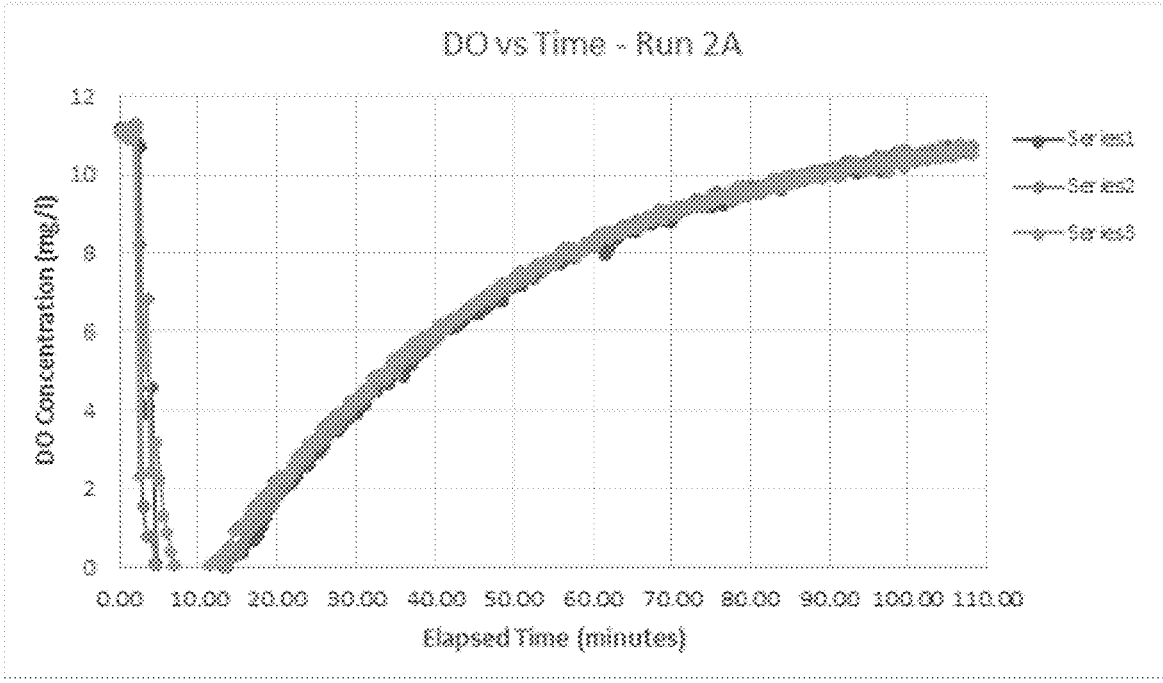
Figure 19:
Figure 20:
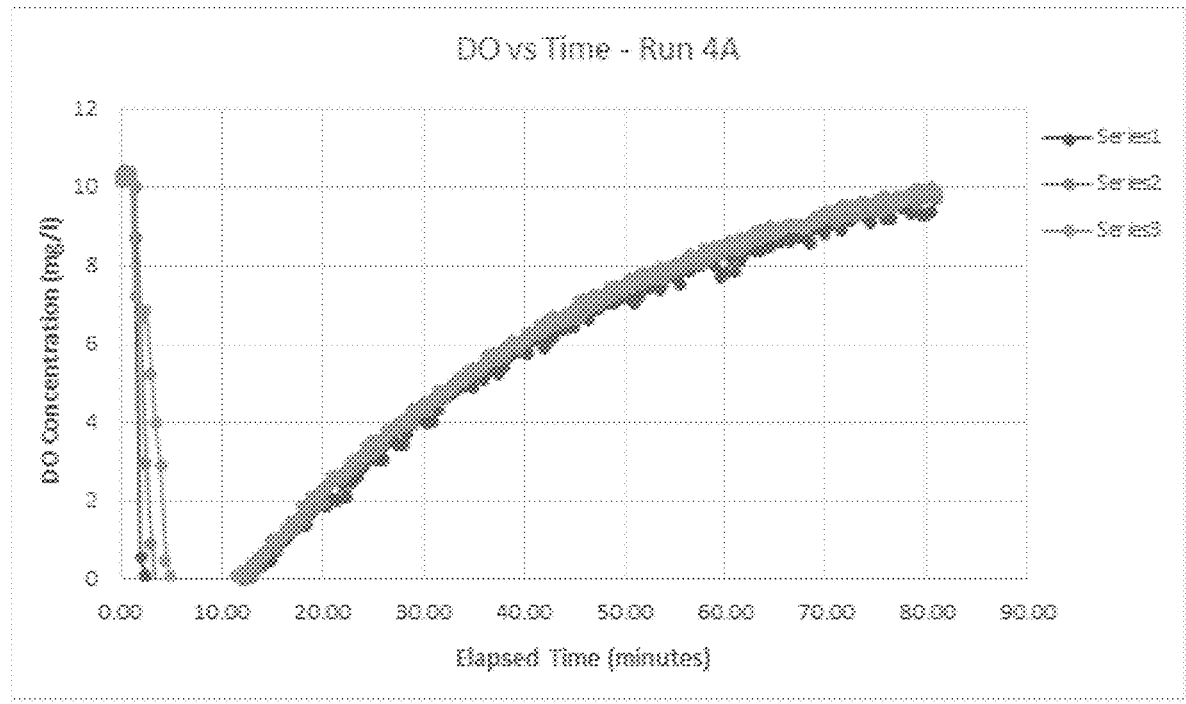
Figure 21:
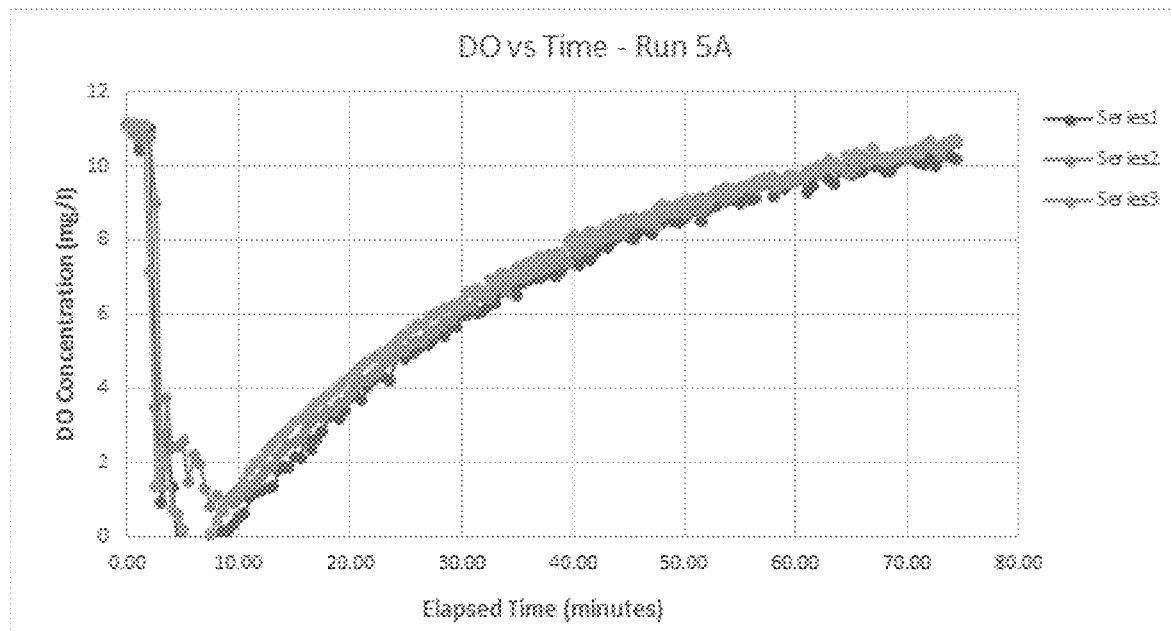
Figure 22:
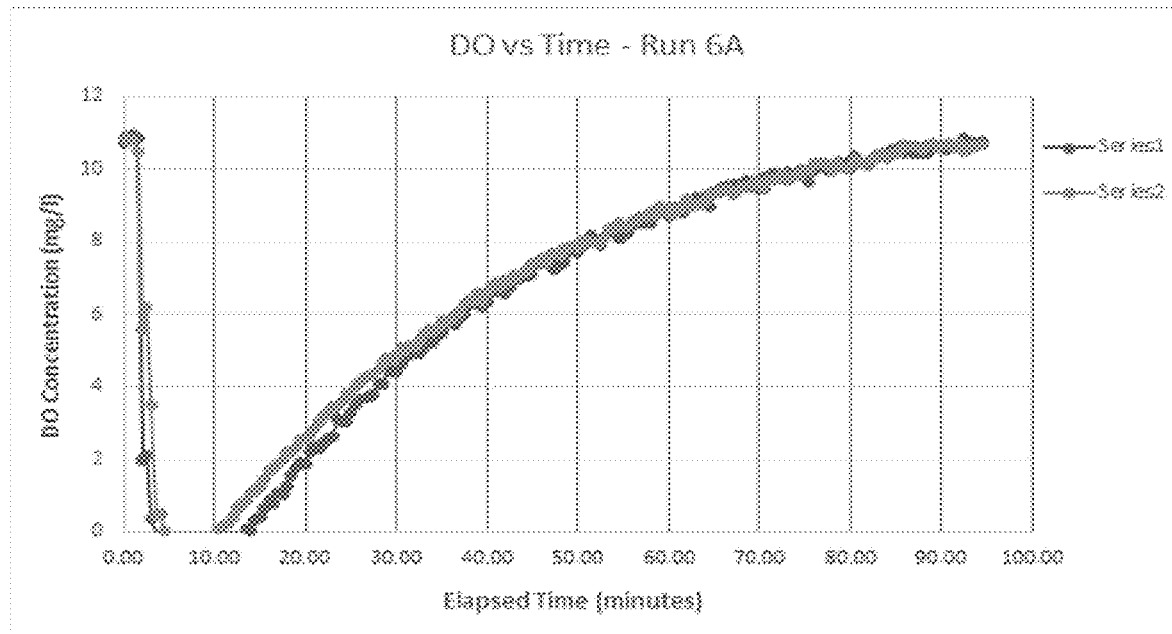

FIGS. 17 through 22 are graphs that show the results of six separate experimental tests of an aerator 10 operating in a test pond. The graphs plot the dissolved oxygen content of the wastewater (mg/l) versus the elapsed time. For each test of FIGS. 17 through 22, the dimension of the test tank was 26 feet wide, 44.33 feet long, and 13.2 feet side-water-depth and the wastewater volume was 432,446 liters. Immediately after the test was initiated, the wastewater was deoxygenated by addition of a chemical deoxygenation agent such as sodium sulfite. The specific parameters for each of the six experimental tests shown in FIGS. 17 through 22 were as follows:

FIG. 17, Test Run 1A:
Average Barometric Pressure: 30.15 in. Hg
Average wastewater Temperature: 12.6 C
Total Dissolved Solids: 910 mg/l
Sodium Sulfite Added: 75 lbs
FIG. 18, Test Run 2A:
Average Barometric Pressure: 30.15 in. Hg
Average wastewater Temperature: 12.7 C
Total Dissolved Solids: 980 mg/l
Sodium Sulfite Added: 100 lbs
FIG. 19, Test Run 3A:
Average Barometric Pressure: 30.15 in. Hg
Average wastewater Temperature: 12.8 C
Total Dissolved Solids: 1055 mg/l
Sodium Sulfite Added: 75 lbs
FIG. 20, Test Run 4A:
Average Barometric Pressure: 30.03 in. Hg
Average wastewater Temperature: 12.9 C
Total Dissolved Solids: 1155 mg/l
Sodium Sulfite Added: 100 lbs
FIG. 21, Test Run 5A:
Average Barometric Pressure: 30.01 in. Hg
Average wastewater Temperature: 12.7 C
Total Dissolved Solids: 1155 mg/l
Sodium Sulfite Added: 100 lbs
FIG. 22, Test Run 6A:
Average Barometric Pressure: 30.02 in. Hg
Average wastewater Temperature: 12.8 C
Total Dissolved Solids: 1155 mg/l
Sodium Sulfite Added: 100 lbs In each of the graphs of FIGS. 17 through 22 the rapid decrease in the concentration of dissolved oxygen immediately after initiation of the test is a reflection of the deoxygenation resulting from addition of sulfite. In each of the graphs, the dissolved oxygen concentration begins to rise steeply and quickly upon activation of the aerator 10 according to the present invention. This is a direct illustration of the oxygenation efficacy and efficiency of the apparatus according to the invention.

As noted above, the present invention utilizes high-volume air pumped into the aerator 10 at low pressure. This directly results in lower power consumption (with concomitant economic advantages) compared to prior art aerators. In Table 1, below, power data for the six test runs shown in FIGS. 17 through 22 are shown:

TABLE 1

| Test No. | Blower Type | Motor Horsepower | Average Amps | Hertz | Average Volts | Watts | Motor Efficiency |
|---|---|---|---|---|---|---|---|
| 1A | Regenerative | 28.60 | 25.60 | 60 | 480 | 14686 | 0.917 |
| 2A | Positive displacement | 20.00 | 16.95 | 60 | 480 | 10710 | 0.930 |
| 3A | Positive displacement | 20.00 | 12.60 | 50 | 480 | 7176 | 0.930 |
| 4A | Positive displacement | 20.00 | 17.00 | 60 | 480 | 10741 | 0.930 |

TABLE 1-continued

| Test No. | Blower Type | Motor Horsepower | Average Amps | Hertz | Average Volts | Watts | Motor Efficiency |
|---|---|---|---|---|---|---|---|
| 5A | Positive displacement | 20.00 | 19.60 | 60 | 480 | 12873 | 0.930 |
| 6A | Positive displacement | 20.00 | 15.00 | 50 | 480 | 9104 | 0.930 |

It will be appreciated that certain structural and operational features of the present invention, as described above and as illustrated in the drawings, provide significant advantages. For example, by locating the ballast ring 20 toward the lower end of the aerator 10 the unit is "bottom weighted" in a manner analogous to the keel on a sailboat. This stabilizes the aerator when it is a pond and maintains the lower peripheral edge 86 of the float head 12 in a submerge position at all times. Typically, the aerator 10 is hoisted with a crane and deposited in a pond. With the ballast ring 20 positioned as shown in the drawings near the lower end of the apparatus, once the ballast ring 20 is submerged the overall strain on the hoisting crane is alleviated due to the increased density of water relative to air, making installation relatively simpler. The aerator 10 according to the invention will often be installed in ponds or lagoons that are in geographic locations that, during winter, experience significant cold temperatures that lead to formation of ice on the pond or lagoon. Because the bulk of aerator 10 is submerged and the lower peripheral edge 86 of float head 12 is continuously beneath the surface of the wastewater, the apparatus is always operable even when the pond or lagoon is frozen, and even if there is significant ice buildup on the upper, exposed components. Thus, as air bubbles flow upwardly toward the surface 212 of a pond (i.e., flow path FPB, FIG. 16) the bubbles tend to break up surface ice. Moreover, the air blown into the system by pump 220 tends to be at a higher temperature than the ambient air due to the heat added by the pump, and the relatively increased air temperature further helps to minimize ice accumulation.

Figure 23:
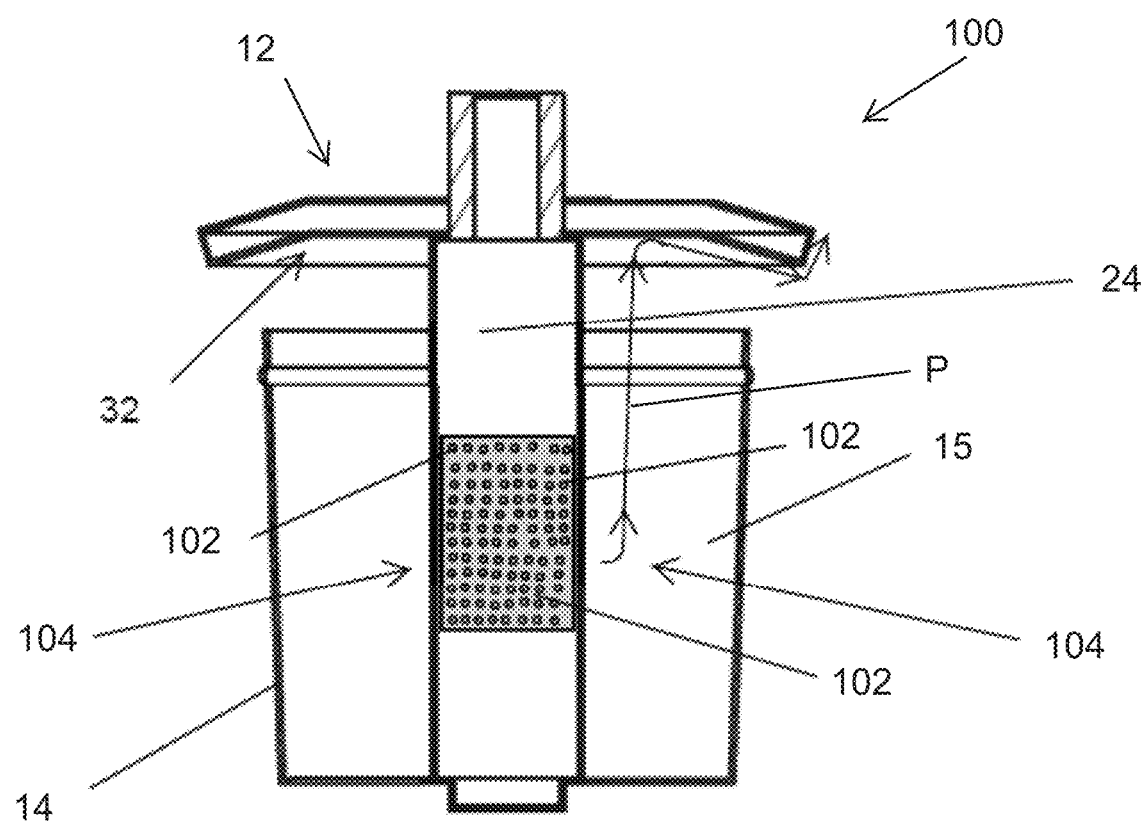
FIG. 23 is a side elevation and cross-sectional view of an alternative embodiment of a floating aerator according to the invention.

It will further be appreciated that various alternative embodiments of an aerator 10 may be fabricated without departing from the scope of the invention. With reference to FIG. 23, an alternative embodiment of an aerator 100 is illustrated, in which the air that is injected into the air manifold 24 is diffused into the oxygen transfer chamber 15 through a plurality of apertures, or bores, 102 drilled through the wall of the air manifold to define air outlet ports in an air diffusing portion 104 of the air manifold. In the semi-schematic illustration of FIG. 23 the number of apertures 102 is greatly reduced from what is used in a working system, and the apertures are larger in the drawing than they would be in a working system, this to better illustrate these structures. It is to be understood that the position of air diffusing portion 104 shown in FIG. 23 is representative only—the air diffusing portion may be shifted upwardly or downwardly or enlarged on the air manifold 24 relative to the position shown. The apertures 102 are preferably formed by drilling the bores normal to the longitudinal axis of the air manifold 24. Alternately, the apertures 102 may be drilled at other angles to the longitudinal axis. In the embodiment illustrated in FIG. 23 the general flow path of air bubbles and wastewater is shown with the arrow P, but it will be understood that the air bubbles and wastewater are moving in a swirling vortex within the oxygen transfer chamber 15. Another alternative embodiment utilizes plural tubes embedded in the float head that radiate outwardly from near the air manifold, extend through the interior of the float head in an arcuate path in a downward path that mimics the concave curvature of the float head described above. The tubes discharge around the peripheral edges of the float head beneath the surface of the wastewater. In yet another alternative embodiment, the barrel 14 may be attached to the float head 12 other than with the air manifold 24. For instance, plural connecting struts could extend between the float head and to the barrel to provide a connection therebetween, with the air manifold and the air diffuser no being physically connected to the barrel.

In some instances, such as where the lagoon or pond into which a floating aerator 10 will be installed is relatively deep, it may be desirable to add draft tubes to the aerator so that wastewater and sludge near the bottom of the pond is drawing into the oxygen transfer chamber 15 through an intake port 52. With reference to FIG. 5, a single draft tube 55 is illustrated. The draft tube 55 directs wastewater and sludge into the associated intake port 52. Plural draft tubes 55 may be added, one for each intake port 52, for example. The length draft tubes may be adjusted to accommodate the depth of the pond below the lower surface of the aerator.

As noted above, there is little "jetting" from the floating aerator described above, and as a result, anchoring is often not necessary. The phrase "area of influence" is often used to describe the physical area in a pond or lagoon that an aerator has an impact upon—that is, the area that is oxygenated by the aerator. One preferred manner of increasing the "area of influence" of a floating aerator 10 according to the invention is to loosely tether each aerator to an anchor point on the shore of the pond with a flexible tether 222 such as a rope, as shown schematically in FIG. 16. The loose rope, together with the flexible air supply hose 200, allows the aerator 10 to "walk" around the pond under the action of wind, thereby enlarging the area of influence of each unit that is located in a pond or lagoon. It is typical that plural aerators 10 may be installed in a single lagoon. With each unit being tethered in the manner indicated, the area of influence of the plural aerators in the pond may be controlled.

Finally, it will be understood that certain modifications to the structure and operation of aerator 10 may be made without departing from the scope of the claims. As one example, the circular float head 12 may be truncated such as at one or both of the phantom lines 300 in FIG. 4, combined with a downwardly extending flange at the truncated portion that has a lower edge that is coincident with the rest of the lower peripheral edge 86.

While the present invention has been described in terms of preferred and illustrated embodiments, it will be appreciated by those of ordinary skill that the spirit and scope of the invention is not limited to those embodiments but extend to the various modifications and equivalents as defined in the appended claims.

The invention claimed is:

1. A floating water and wastewater aerator, comprising:
a buoyant float head having an air intake port, a lower peripheral edge, and a concave lower surface;
a barrel defining an oxygen transfer chamber, the barrel having at least one barrel intake port, and an upper peripheral edge spaced apart from the concave lower surface; and
an air manifold connected to the air intake port and an air diffuser in the oxygen transfer chamber, in which the air diffuser comprises a frustoconical member having a diffuser layer with plural air apertures and a membrane sealed to the diffuser layer, the membrane having plural air passageways,
wherein the membrane is configured to expand outwardly away from the diffuser layer when air is flowing through the floating water and wastewater aerator to thereby cause air bubbles to emit from the plural air passageways in the membrane,
wherein the plural air passageways in the membrane are defined by slits, and
wherein the buoyant float head has a diameter at the lower peripheral edge, the barrel has a diameter at the upper peripheral edge, and where the diameter of the buoyant float head at the lower peripheral edge is greater than the diameter of the barrel at the upper peripheral edge and the concave lower surface of the buoyant float head is defined by a plurality of stepped and sloped concentric edges.

2. The floating water and wastewater aerator according to claim 1 wherein the plural air passageways in the membrane are spaced incrementally and horizontally apart on the frustoconical member.

3. The floating water and wastewater aerator according to claim 1 which the upper peripheral edge of the barrel extends beyond the lower peripheral edge of the buoyant float head.

4. The floating water and wastewater aerator according to claim 3 including a ballast chamber having sufficient weighting material for floating the floating water and wastewater aerator such that the lower peripheral edge of the buoyant float head is submerged in water or wastewater and such that the air intake port is above a surface of the water or the wastewater.

5. The floating water and wastewater aerator according to claim 4 in which the buoyant float head is circular and the air intake port is at the axial center of the buoyant float head, the air manifold extends axially through the buoyant float head and the barrel.

6. The floating water and wastewater aerator according to claim 5 in which a lower end of the barrel is open and plural struts extend across the open lower end to define plural barrel intake ports.

7. The floating aerator according to claim 1 in which the at least one barrel intake port is in a sidewall of the barrel.

8. The floating aerator according to claim 1 in which an air flow path is defined from: (a) the air intake port; (b) into the air manifold, (c) through the plural air apertures in the air diffuser and into the oxygen transfer chamber, (d) to the concave lower surface of the buoyant float head, (e) along the concave lower surface away from the air manifold, and (f) past the lower peripheral edge of the buoyant float head.

9. The floating water and wastewater aerator according to claim 1, wherein the plural air passageways of the membrane are over the entire membrane.

10. A floating water and wastewater aerator, comprising:
a floating head having an air intake port on an upper surface thereof, a lower lip defining a lower peripheral edge, and a concave lower surface;
a main chamber having at least an intake port, an upper peripheral edge spaced apart from the lower peripheral edge of the floating head to define a discharge slot therebetween; an air manifold connected to the air intake port; and
an air diffuser in the main chamber and connected to the air manifold, which the air diffuser is defined by a frustoconical member having plural air apertures and a membrane sealed to the frustoconical member at upper and lower edges thereof, the membrane having plural air passageways formed therein,
wherein the membrane is configured to expand outwardly away from the frustoconical member when air is flowing through the floating water and wastewater aerator to thereby cause air bubbles to emit from the plural air passageways in the membrane, wherein the plural air passageways in the membrane are defined by slits, and
wherein the floating head has a diameter at the lower peripheral edge, the main chamber has a diameter at the upper peripheral edge, and where the diameter of the floating head at the lower peripheral edge is greater than the diameter of the main chamber at the upper peripheral edge and the concave lower surface of the floating head is defined by a plurality of stepped and sloped concentric edges.

11. The floating water and wastewater aerator according to claim 10, wherein the plural air passageways of the membrane are over the entire membrane.

12. A floating water and wastewater aerator, comprising, a buoyant float head having an air intake port, a lower peripheral edge, and a lower concave surface; a barrel defining an oxygen transfer chamber, the barrel having at least one barrel intake port, and an upper peripheral edge spaced apart from the lower concave surface of the buoyant float head to define an air and water discharge gap between the upper peripheral edge of the barrel and the lower concave surface of the buoyant float head; an air manifold connected to the air intake port; and wherein the air manifold interconnects the buoyant float head and the barrel and includes a frustoconical air diffuser having plural air apertures in the oxygen transfer chamber and an expandable membrane having plural air passageways therethrough sealed to the frustoconical air diffuser,
wherein the expandable membrane is configured to expand outwardly away from the frustoconical air diffuser when air is flowing through the floating water and wastewater aerator to thereby cause air bubbles to emit from the plural air passageways in the membrane, wherein the plural air passageways in the membrane are defined by slits, and
wherein the buoyant float head has a diameter at the lower peripheral edge, the barrel has a diameter at the upper peripheral edge, and where the diameter of the buoyant float head at the lower peripheral edge is greater than the diameter of the barrel at the upper peripheral edge and the concave lower surface of the buoyant float head is defined by a plurality of stepped and sloped concentric edges.

13. The floating water and wastewater aerator according to claim 12, wherein the plural air passageways of the membrane are over the entire membrane.

* * * * *